US006539853B1

(12) United States Patent
Hess et al.

(10) Patent No.: US 6,539,853 B1
(45) Date of Patent: Apr. 1, 2003

(54) SMART CARD CONNECTOR WITH RETAIN AND EJECT MEANS

(75) Inventors: Achim Hess, Korb (DE); Martin Gollhofer, Fellbach (DE); Klaus Siegert, Sindelfingen (DE)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 174 days.

(21) Appl. No.: 09/706,423

(22) Filed: Nov. 3, 2000

(30) Foreign Application Priority Data

Nov. 4, 1999 (DE) ........................................ 199 53 251
Nov. 4, 1999 (DE) ........................................ 199 53 244

(51) Int. Cl.[7] ............................ B30B 1/08; B60T 17/22

(52) U.S. Cl. ......................... 100/270; 100/49; 100/299; 60/534

(58) Field of Search .............................. 100/35, 48, 99, 100/240, 269.01, 269.18, 269.07, 299, 269.06, 270; 72/453.02, 453.06, 453.08, 453.18; 60/545, 571, 534, 581

(56) References Cited

U.S. PATENT DOCUMENTS 5,095,725 A * 3/1992 Wada et al. ................ 310/328
5,138,217 A * 8/1992 Wada et al. ................ 310/317
5,205,147 A * 4/1993 Wada et al. ................ 310/328
5,937,505 A * 8/1999 Strong et al. ................. 29/593

FOREIGN PATENT DOCUMENTS

| | | | |
|---|---|---|---|
| CH | 671 187 A | * | 8/1989 |
| DE | 4015196 A1 | | 11/1990 |
| DE | 19705893 A1 | | 8/1998 |
| JP | 60-177897 A | * | 9/1985 |
| JP | 63-286299 A | * | 11/1988 |
| JP | 11-179600 A | * | 7/1999 |

* cited by examiner

*Primary Examiner*—Allen Ostrager
*Assistant Examiner*—Jimmy Nguyen
(74) *Attorney, Agent, or Firm*—Roger C. Turner, Esq.

(57) ABSTRACT

A press that includes a push rod (12) that can be pushed downward to cut and mold miniature components, has a small size and a minimum number of components, and can be easily and precisely controlled. The push rod has a largely upwardly-facing shoulder (140) that lies in a chamber that can receive pressured hydraulic fluid to push down the push rod. A piezoelectric actuator, or piezoactor (18), moves a piston (20) that lies in a pressure cylinder. One end of the pressure cylinder holds hydraulic fluid (130), and when the piezoactor pushes the piston it pressurizes the hydraulic fluid therein. Pressured hydraulic fluid in the pressure cylinder flows through a passage (23) to the rod chamber to press down the push rod. The cross-sectional area of the pressure cylinder is many times greater than the cross-sectional area of the push rod shoulder so slight movement of the piezoactor is magnified many times by the hydraulic fluid to move the push rod with a long stroke.

4 Claims, 3 Drawing Sheets

SMART CARD CONNECTOR WITH RETAIN AND EJECT MEANS

CROSS-REFERENCE

Applicant claims priority from German patent application 199 53 244.3-14 filed Nov. 4, 1999, and German patent application 199 53 251.6-14 filed Nov. 04,1999.

BACKGROUND OF THE INVENTION

There is a need for small presses to cut and mold miniature components. One type of large press includes a motor-driven pump that pumps hydraulic fluid to a high pressure, and valves that direct the fluid into chambers at a push rod to push it down and then push it up again. The hydraulic fluid reservoir, pump and motor for driving it, and valves for controlling movement of the push rod, are of large size and considerable cost, and are unsuitable for miniature presses. A relatively simple type of miniature press includes a crank mechanism for moving down a push rod, with the crank mechanism operated by a small electric motor or even by hand. It is difficult to closely control movement of the crank-driven push rod, with only a sinusoidal force-displacement profile usually present. A miniature press, such as one that applies a force of no more than several (seven) tons to the push rod, which was of simple and low cost construction and yet which could be precisely controlled, would be of value.

SUMMARY OF THE INVENTION

In accordance with one embodiment of the present invention, a miniature press is provided for cutting and molding miniature components by moving down a push rod, wherein downward force on the push rod is obtained by a piezoelectric actuator that is coupled through a hydraulic transmission that amplifies movement of the piezoelectric actuator. The piezoelectric actuator, or piezoactor, is connected to a pressure piston that moves in a pressure cylinder. When the piezoactor moves the pressure piston toward a first end of the pressure cylinder, the piston compresses hydraulic fluid. The hydraulic fluid is coupled to a rod chamber that contains hydraulic fluid that presses against an upwardly-facing shoulder on the push rod to move down the push rod. The area of the push rod shoulder that is exposed to hydraulic fluid is a small fraction of the area of the pressure piston that pushes against hydraulic fluid in an end of the pressure cylinder. As a result, small movement of the piezoactor is converted into large movement of the push rod. The piezoactor responds almost instantaneously to changes in electricity applied to it, so close control of go push rod movement is achieved.

A force sensor that senses force applied by the push rod and a movement sensor that senses movement and/or position of the push rod, are connected to a control that delivers current to the piezoactor, to closely control movement of the piezoactor and therefore of the push rod. The very low moving mass of the piezoactor and hydraulic fluid increases control of movement of the piezoactor and of the push rod. The hydraulic transmission avoids the need to move the larger mass of a mechanical connection and avoids the "play" in mechanical parts that would decrease control;

The pressure cylinder preferably has first and second opposite ends, with hydraulic fluid in each end. Also, the rod chamber preferably has a second chamber portion that opens to a downwardly-facing shoulder of the push rod. The piezoactuator can be moved in a second direction that is opposite to the first, to move the pressure piston so as to pressurize fluid in the second end of the pressure cylinder and thereby push up the push rod. By close control of upward movement of the push rod as well as downward movement, efficient operation of the press can be obtained.

The press can include a plurality of piezoactors that are energized in unison to move separate pressure pistons whose ends are connected to the same chamber portions that move the push rod. This allows for large displacement distances of the push rod, to adapt the press to different product settings.

The provision of a force sensor that senses force on the push rod and a rod position sensor, makes it possible to closely monitor operation of the press. In one example, an increase in force required for a given push rod movement, may indicate that the tool is worn and needs replacing. Such sensing enables close control of push rod movement, which can be useful to enable the processing of different materials or materials of different thicknesses, using the same tooling.

The novel features of the invention are set forth with particularity in the appended claims. The invention will be best understood from the following description when read in conjunction with the accompanying drawings.

DESCRIPTION OF THE PREFERRED EMBODIMENTS DESCRIPTION OF SIMPLIFIED EMBODIMENT

Figure 1:
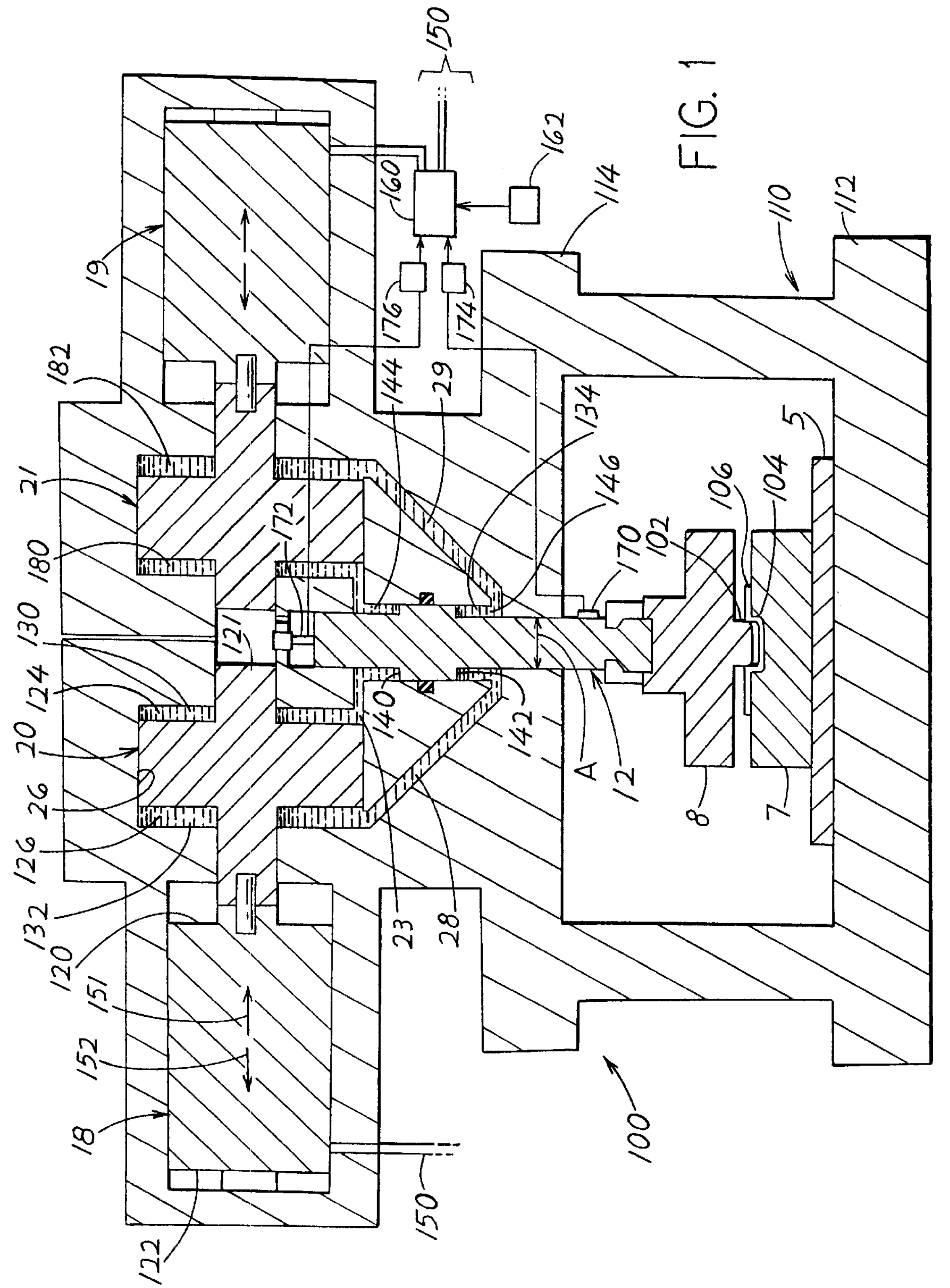
FIG. 1 is a simplified sectional view of a press constructed in accordance with the present invention.

FIG. 1 is a simplified view of a press 100 of the invention, which includes a push rod 12 that can push an upper tool half 8 toward a lower tool half 7. The tool halves are shown forming dies 102, 104 for downwardly deforming portions of a plate 106. The push rod 12 is shown lifted halfway from its most downward position to its most upward position. The press includes a frame 110 with a lower portion 112 that supports a press plate 5 on which the lower tool half is mounted. The frame also has an upper part 114 on which the push rod 12 is mounted and on which apparatus for moving the push rod is mounted. Apparatus for moving the push rod includes a piezoelectric actuator, or piezoactor 18. The piezoactor has opposite ends 120, 122, with the second end 122 connected to the frame 110 and with the first end 120 fixed to a pressure piston 20. The pressure piston 20 lies in a pressure cylinder 26. The pressure cylinder has first and second cylinder portions 124, 126, that are each filled with hydraulic fluid 130, 132. It is noted that the term "cylinder" refers to a cavity in which a piston can move, and is not necessarily geometrically cylindrical.

The push rod 12 lies in a push rod chamber 134. The push rod has collars that form an upwardly-facing shoulder 140 and a downwardly-facing shoulder 142. The shoulders, which each faces at least partially up or down, face portions 144, 146 of the rod chamber 134. The upper chamber portion 144 is connected through passage or duct 23 to the pressure cylinder portion 124. The lower chamber portion 146 is connected to the pressure cylinder portion 126 through another duct 28.

When the piezoactor 18 is energized to move in the direction 151, it moves the pressure piston 20 in the same direction, and increases the pressure of hydraulic fluid 130 in the cylinder portion 124. That pressured hydraulic fluid 130 flows through the duct 23 to the upper chamber portion 144 to push down against the shoulder 140 and thereby push down the push rod 12. When the piezoactor 18 is energized to move in direction 152, it moves the pressure piston 20 in that direction, thereby increasing the pressure of hydraulic fluid 132 in the cylinder portion 126. The pressured fluid 132 flows through duct 28 toward the lower chamber portion 146 to push up against the push rod shoulder 142, thereby pushing up the push rod. At the same time, fluid in the upper chamber portion 144 flows back to the cylinder portion 124.

In most cases, only a small force is required to lift the push rod 12, so it would be possible to use the piezoactor 18 only to push down the push rod and a spring to push it up. However, by using the piezoactor 18 to also push up the push rod 12 applicant closely controls upward movement of the push rod, as well as closely controlling its downward movement.

The area of the pressure piston at cylinder end 124 is many times greater than the area of the push rod shoulder 140. In one example, the push rod 12 has a diameter A of 20 mm, while the shoulder 140 has an outside diameter of 28 mm. Also, the pressure piston 120 has an outside diameter of 88 mm, and a guided end 121 of a diameter of 24 mm. The area of the shoulder 140 exposed to hydraulic fluid is 286 $mm^2$, while the area of the pressure piston 20 exposed to the cylinder part 124 is 5617 $mm^2$. The ratio of areas is 19.6 to 1, or about 20 to 1. As a result, a given movement of the piezoactor 18 such as 1 mm results in the push rod 12 moving by about 20 times as far, or about 20 mm. This is desirable because piezoelectric materials commonly deform or expand only a small amount, but can apply large forces.

FIG. 1 shows that electricity is applied to lines 150 leading to actuator 18, by a control 160 that supplies current at a controlled high voltage from an electricity source 162. Applicant uses a force sensor 170 to measure the force transmitted by the push rod, with the compressive force during downward push rod movement usually being the most important. The force sensor 170 can be a strain gauge. Applicant also has a displacement detector 172 that measures the position of the push rod at any given time. The force and displacement sensors 170, 172 are connected to circuits 174, 176 that provide inputs to the control 160. In one example, the force circuit 174 is set to prevent any further downward pressure on the push rod when the downward force on the push rod exceeds a predetermined force such as 200 pounds. In another example, the displacement circuit 176 is set to stop energization of the piezoactor to push down the push rod further, when the push rod reaches a predetermined position. The use of an electrical control enables close control of push rod movement, including the force it applies, when it is prevented from further downward movement, and how rapidly it moves down and up. Where parts are rapidly moved to a predetermined position between the tool halves 7, 8, a sensor can sense that the workpiece is in its desired position and immediately energize the piezoactor 18 to move down the push rod 12. Since the piezoactor 18 and hydraulic fluid move only short distances, and the push rod 12 is of only small mass, the push rod can be rapidly accelerated.

FIG. 1 shows that the press includes a second piezoelectric actuator, or piezoactor device 19 that can move a second pressure piston device 21 to pressurize hydraulic fluid in cylinder parts 180, 182. The cylinder part 180 is connected to the upper chamber portion 144, while the cylinder part 182 is connected to the lower chamber part 146. The second piezoactor 19 can be energized to increase the travel of the push rod 12. It is also possible to provide additional upwardly and downwardly facing shoulders on the push rod that are connected to the cylinder portions 180, 182 to increase the force applied by the push rod.

DESCRIPTION OF DETAILED EMBODIMENT

Figure 2:
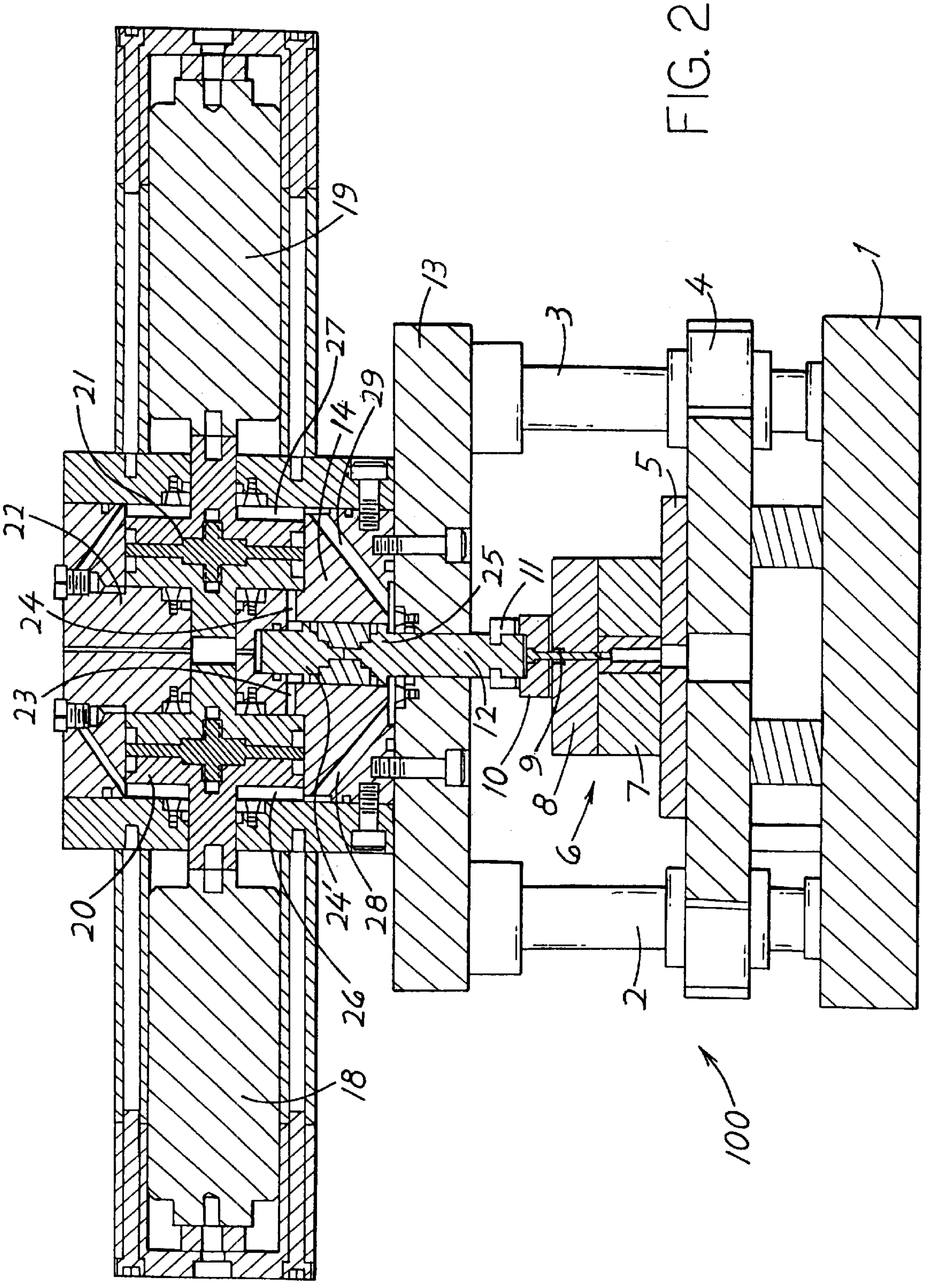
FIG. 2 is a more detailed sectional view of the press of FIG. 1.

FIG. 2 shows greater details of the press 100, which includes a base plate 1 and a plurality of columns mounted on the base plate 1. The columns 2, 3 are used for securing a displaceable tool receiving plate 4.

Arranged on the tool receiving plate 4 is the pressure plate 5. A tool unit is disposed on the pressure plate 5. The tool unit 6 is formed by the lower tool half 7 and upper tool half 8. A die 9 is axially displaceably guided in the upper tool half 8.

The end of the die 9 remote from the lower tool half 7 is accommodated with clearance in a lower coupling half 10. The lower coupling half 10 cooperates with an upper coupling half 11, in order to couple the die 9 with the push rod 12. The push rod 12 is displaceably guided in a base plate 13 and projects with its end remote from the die 9 into a hydraulic transmission device 14. The base plate 13 belongs to the hydraulic transmission device 14 and is supported by the columns 2, 3.

The hydraulic transmission device 14 is used to transmit the movement of the two piezoactors 18, 19 via the two transmission pistons 20, 21 and a suitable hydraulic fluid to the push rod 12. The transmission pistons 20, 21 are constructed in three parts in order to allow for the securing of sealing rings in their center. The pistons 20 and 21 are accommodated in the cylinder chambers 26, 27 in a housing base element 22 so as to reciprocate and are coupled with the piezoactors 18, 19. The hydraulic fluid ducts 23, 24 provide a connection between the end faces of the pistons 20, 21 remote from the piezoactors and the push rod 12. Constructed on the push rod 12 is a first collar 24', which is acted upon by the hydraulic pressure on the side remote from the tool. In addition, a second collar 25 is constructed on the push rod 12. On the side remote from the first collar 24', the second collar 25 communicates via ducts 28, 29 with the end faces of the pistons 20, 21 facing the piezoactors. Hydraulic fluid is disposed in the cylinder chambers 26, 27.

In FIG. 2, the piezoactors 18 and 19 are in their displaced state. The transmission pistons 20 and 21 have moved towards one another. Consequently, the push rod 12 and the die 9 have been moved toward the pressure plate 5.

When the piezoactors 18, 19 move away from one another, this also results in the transmission pistons 20, 21 moving away from one another. Consequently, the hydraulic fluid disposed on the side of the pistons 20, 21 remote from the piezoactors is displaced. This displacement is transmitted via the ducts 28, 29 to the second collar 25 of the push rod 12. In this manner, the push rod 12 is moved back into its starting position.

Figure 3:
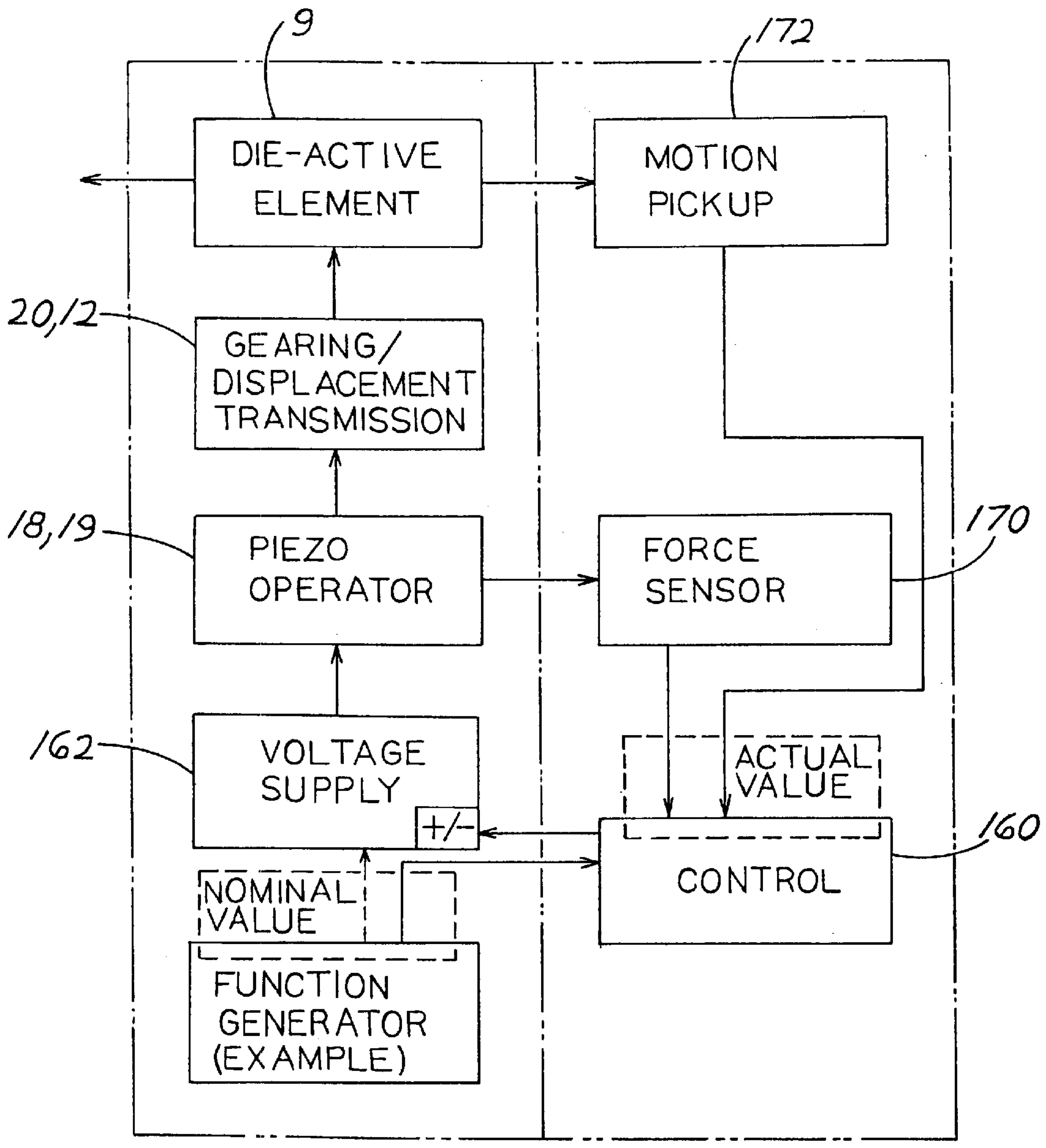
FIG. 3 is a block diagram showing the manner in which operation of the press is controlled.

The block diagram illustrated in FIG. 3 shows how the press illustrated in FIGS. 1 and 2 is controlled during operation. On the one hand, the displacement movement of the die 9 is detected with the aid of the motion pickup 172. In addition, the piezoactors 18, 19, which are also referred to as piezo operators, are equipped with force sensors 171 which supplement the other force sensor 170 (FIG. 1). The motion pickup and the force sensors supply their measurement values to a control 160, which communicates with a function generator and the voltage supply of the piezoactors.

While terms such as "up" and "down" have been used to describe the invention as it is illustrated, the press can be used in any orientation.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A press, comprising:

a push rod that lies in a rod chamber, said push rod having first and second shoulders facing at least partially in first and second opposite directions, said rod chamber having first and second rod chamber portions that contain fluid lying against said first and second shoulders, respectively, a pressure container which includes a cylinder and a piston lying in said cylinder, said cylinder having first and second opposite cylinder end portions that contain fluid and that are coupled respectively to said first and second rod chamber portions;

a piezoelectric actuator coupled to said piston to move it selectively toward said first and second end portions of said cylinder to pressurize fluid in the corresponding cylinder end portion, to thereby urge the push rod in a selected one of said opposite directions.

2. The press described in claim 1 including:

a second piezoactor device which is moveable parallel to said piezoelectric actuator;

a second pressure cylinder device with first and second opposite end portions, a second piston lying in said second cylinder device and connected to said second piezoactor device;

said first and second end portions of said second cylinder device are connected respectively to said first and second chamber portions of said rod chamber.

3. A press which includes a base for supporting a lower tool and a push rod for pressing an upper tool toward the lower tool to apply force to a workpiece lying substantially between the tools, comprising:

a frame;

at least one piezoelectric actuator mounted on said frame;

a pressure cylinder in said frame that holds hydraulic fluid;

a piston that lies in said pressure cylinder and that is connected to said actuator to be moved in at least a first direction by said actuator;

a push rod chamber first part in said frame, said push rod having an upwardly facing push rod shoulder lying in said chamber first part;

said frame having a first duct connecting said pressure cylinder to said first chamber part;

said pressure cylinder has first and second end portions that each holds hydraulic fluid, with said first end portion connected to said first duct; and including a push rod chamber second part in said frame, said push rod having a downwardly-facing push rod shoulder lying in said chamber second part, and said frame having a second duct connecting said cylinder second end portion to said second chamber part.

4. A press which includes a base for supporting a lower tool and a push rod for pressing an upper tool toward the lower tool to apply force to a workpiece lying substantially between the tools, comprising:

a frame;

first and second piezoelectric actuators mounted on said frame;

first and second pressure cylinders lying in said frame and each holding hydraulic fluid;

first and second pistons that lie respectively in said first and second cylinders and that are each connected to one of said actuators;

a push rod chamber first part in said frame, said push rod having an upwardly facing push rod shoulder lying in said chamber first part.

* * * * *

UNITED STATES PATENT AND TRADEMARK OFFICE

CERTIFICATE OF CORRECTION

PATENT NO. : 6,539,853 B1

DATED : April 1, 2003

INVENTOR(S) : Achim Hess, Martin Gollhofer and Klaus Sieqert

It is certified that error appears in the above-identified patent and that said Letters Patent is hereby corrected as shown below:

Title page, Item [54] and Column 1, lines 1 and 2,
Change "SMART CARD CONNECTOR WITH RETAIN AND EJECT MEANS" to -- PRESS --

Signed and Sealed this

Nineteenth Day of August, 2003

JAMES E. ROGAN

*Director of the United States Patent and Trademark Office*